Figure 1:
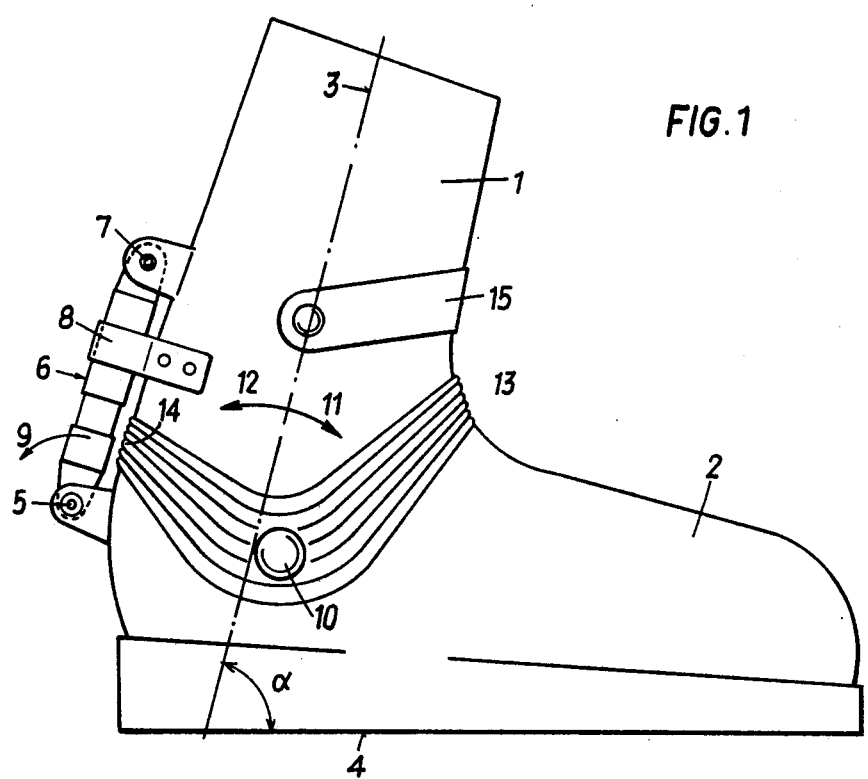

United States Patent [19]
Fritsch

[11] 4,455,769
[45] Jun. 26, 1984

[54] SKI BOOT

[75] Inventor: Felix Fritsch, Vienna, Austria

[73] Assignee: Koflach Sportgerate Gesellschaft m.b.H., Koflach, Austria

[21] Appl. No.: 311,652

[22] Filed: Oct. 15, 1981

[30] Foreign Application Priority Data

Oct. 16, 1980 [AT] Austria .................................. 5140/80

[51] Int. Cl.³ ............................................... A43B 5/04
[52] U.S. Cl. .................................................... 36/121
[58] Field of Search ................. 36/117, 118, 119, 120, 36/121

[56] References Cited

U.S. PATENT DOCUMENTS 3,535,800 10/1970 Stohr ..................................... 36/120
3,686,778 8/1982 Hornung .............................. 36/120

FOREIGN PATENT DOCUMENTS 2025283 12/1971 Fed. Rep. of Germany ........ 36/120

Primary Examiner—Patrick D. Lawson
Attorney, Agent, or Firm—Cushman, Darby & Cushman

[57] ABSTRACT

A ski boot comprises a boot leg linked to a boot shell for free pivotal movement and a device for delimiting the pivotal movement of the boot leg formed of a resilient and damping element which is pivotally fixed between the boot leg and the boot shell on the boot leg and on the boot shell.

14 Claims, 8 Drawing Figures

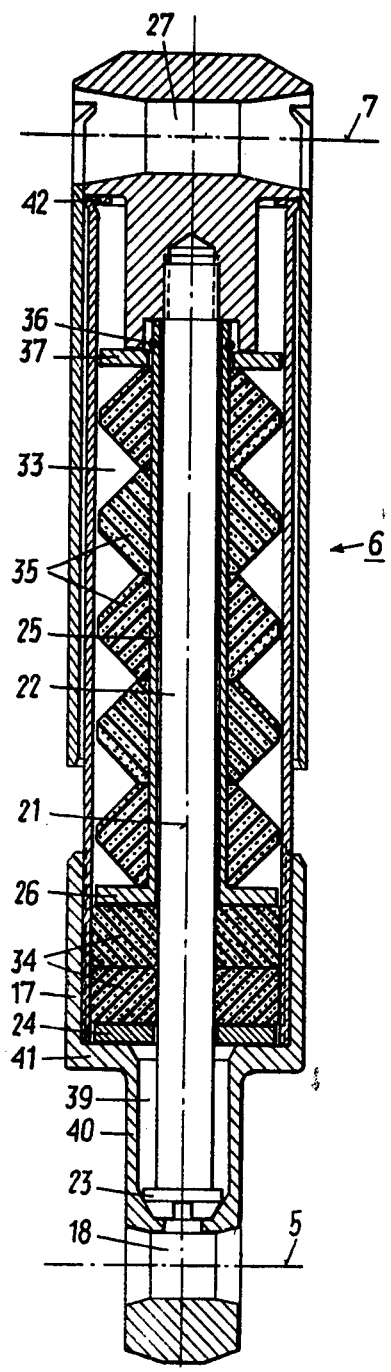
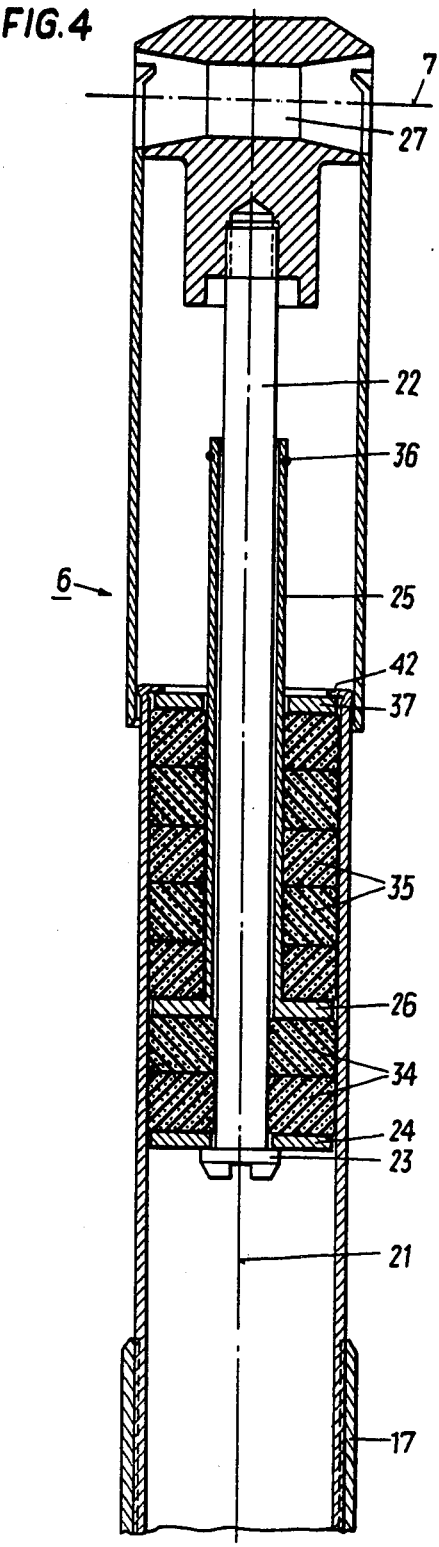

SKI BOOT

The invention refers to a ski boot comprising a leg pirotally linked to a shell and a means for limiting the pivotal movement of the leg relative to the shell, particulary in combination with an inner boot. With such known ski shoes, the leg is tightened against the shank of the skier by means of buckles or other fastening elements. In closed condition, the pivotability of the leg relative to the shell is primarily restricted by the friction of the material of the leg on the outer wall of the shell. The friction characteristics of the material of the shell and of the material of the leg are, however, to a substantial degree temperature-dependent and are, in addition, changed in a quite uncontrollable manner by any icing up or any water films between the shell and the leg. Any construction of ski boots shall in case of an accident be capable of preventing complicated and difficultly healing fractures, particulary ankle fractures, and this task can reliably be solved only if the bending moment achieved prior to reaching the locking position of the ankle joint is exactly defined in a reliable manner. It is, therefore, an essential requirement for a reliable ski boot that the locking position of the ankle joint corresponding to a forward lean or vorlage of approximately 45 degrees be only reached with a bending moment corresponding to a minimum fracture moment for a mean diameter of the bone. Such a requirement must, however, not result in the formation of a boot leg resisting to bending moment when considering that the comfort of the wearer of the shoe shall be retained. For a sufficient comfort of the wearer of a ski boot it is of substantial importance that a sufficient angular path be warranted from the starting postiton of the boot leg up to a position located at a safety distance from the locking position of the ankle joint. This angular path shall amount to at least 20 degrees and there shall additionally be provided the possibility to swivel the boot leg beyond a neutral position, which corresponds to the usual forward lean or vorlage of about 9 to 12 degrees with respect to the sole plane, in direction to a vertical position of the leg with respect to the sole plane for the purpose of providing a high wearer's comfort even on standing. All of the mentioned conditions can not be fullfilled on basis of the temperature-dependency and on the mechanical properties of the elastomeric synthetic plastics material by mearly relying to the friction of the boot leg on the boot shell.

It is already known to provide ski boots with a tongue of relatively high bending resistivity and to resiliently support this tongue against a point located near the boot tip. In this manner, the maximum admissible forward lean or vorlage can be restricted but there are generated undesired high restoring forces with increasing forward lean or vorlage. In view of the elements used up till now being resilient elements, damping of sudden shocks generated in forward lean position could only insufficiently be effected.

The invention now aims at providing the required kinematics and damping of the pivotal movement of the boot leg relative to the boot shell independent of the material of the boot shell and of the boot leg and at providing with only one single element an exact definition of the desired angle-dependent bending moments for any further pivotal movement of the boot leg without generating substantial restoring forces. For solving this task the invention essentially consists in that the boot leg is linked to the boot shell for free pivotal movement and in that the means for delimiting the pivotal movement of the boot leg is formed of a resilient and damping element which is pivotally fixed between the boot leg and the boot shell on the boot leg and on the boot shell. In view of the boot leg being freely pivotable on the boot shell, the temperature-dependent influences of the material of the boot shell and of the boot shaft are made ineffective and the desired damping effect is exclusively provided by the resilient and damping element pivotably linked between the boot leg and the boot shell on the boot leg and on the boot shell. The spring action shall allow a substantial force-free return into the starting position and, respectively, the neutral position mentioned above, and by providing a separate damping element, which is for its own responsible for damping the pivotal movement, the desired kinematics can be adjusted with the required precision.

For reliably obtaining a free pivotability, the arrangement is preferably such that the internal wall of the boot leg is, preferably by means of friction-reducing washers at the joints, kept at a distance from the external wall of the boot shell over the whole pivotal path. For warranting tightness of the boot shell, the boot leg can in a simple manner be connected at the wrist portion and at the heel portion with the boot shell by means of bellows.

The resilient and damping element is preferably arranged at the heel portion of the shoe where a correspondingly sized damping element can be provided without detracting from the wearer's comfort.

According to the invention, the resilient and damping element is formed of a double-acting cylinder-piston-aggregate. It is principally conceivable to design such a damping element as a hydraulic or pneumatic cylinder-piston-aggregate, noting that, however, the construction would be expensive by using pre-stressed valves within the interior of the cylinder-piston-aggregate, an excellent damping action of the desired type results if the working spaces of the cylinder-piston-aggregate contains elastomeric synthetic plastics materials, particulary rubber elements, whose cross-sectional shape is, in a neutral position of the boot leg relative to the boot shell and particulary in a relaxed condition corresponding to a usual forward lean or vorlage of 9 to 12 degrees relative to the sole plane, only incompletely filling the volume of the working spaces. Such elastomeric synthetic plastics material, particulary rubber elements, can elastically be deformed, what results in only low restoring forces. In view of the elastomeric synthetic plastics materials and, respectively, rubber elements being incompressible, the friction of the elements of elastomeric synthetic plastics material or rubber, respectively, on the walls of the working spaces is increased by such a deformation. A limiting action is with increasing damping action achieved if the elements of elastomeric synthetic plastics material and, respectively, rubber are nearly completely filling the working spaces in a completely deformed condition. In such a case, the elements of elastomeric synthetic plastics material, particulary rubber, are preferably designed as O-rings, respectively, as rings having a substantially triangular cross-section, the rings being stacked one above the other in axial direction of the cylinder-piston-aggregate. On elastic deformation of such elements these elements occupy as a consequence a substantially rectangular or square cross-section and the friction area on the walls of the working spaces becomes greater with increasing elastic deformation. Damping of the pivotal movement is thus progressively increasing and with consideration of the relatively low elastic deformation forces, the restoring forces for restoring the neutral position corresponding to the usual forward lean or vorlage remain relatively small.

In a particulary simple manner the arrangement is such that a plunger and a thrust piston are designed as separate discs, said discs cooperating with stops of a piston rod. In this manner the fact can be taken into consideration that, starting from the neutral position, a substantially greater pivotal angle in direction to the forward lean position is admissible than is admissible in opposite direction. For providing any collision between stops of the piston rod with the internal circumference of the elements of elastomeric synthetic plastics material or rubber and for reliably preventing any damage of these elements, the arrangement can be such that the stop of the disc forming the plunger is designed as a pressure bushing arranged for being shifted relative to the piston rod and extending through the elements arranged for damping the movement in direction to forward lean position and extending through an upper limiting disc. The elements of elastomeric synthetic plastics material and, respectively, rubber are compressed on tension stress between the internal wall of the cylinder and the pressure bushing, which results in an excellent damping action. By providing a plunger separately from the thrust piston it becomes, in correspondence to the required spring excursion and pivotal angles, possible to compress all elements of elastomeric synthetic plastics material or rubber on tension stress and to compress only part of said elements on compression stress, so that the resilient and damping element can be given a small size. In this manner the fact is equally considered that the limitation of the pivotal path by subjecting the resilient and damping element to pressure becomes already effective at a pivotal angle of the ankle joint approximately corresponding to a normal position of the wearer's leg relative to the sole plane and thus being located at a greater safety distance from a pivotal angle which could become dangerous for the ankle. Preferably, the pressure bushing has an axial lenght corresponding to 60 to 80% of the total axial lenght of the relaxed elements of elastic synthetic plastics material, particulary rubber on tension stress, i.e. on maximum admissible forward lean or vorlage all elements are compressed whereas on pressure stress only 20 to 40% of said elements of elastomeric synthetic plastics material or rubber are compressed.

For preventing off-center forces to act on the cylinder-piston-aggregate on strong edging of the ski, the cylinder-piston-aggregate is provided at both of its ends with bearing eyes the inner diameter of which at least partially exceeds the diameter of the associated anchoring bolt. Some lateral pivotability of the cylinder-piston-aggregate relative to the plane extending normally relative to the sole plane and in longitudinal direction of the sole is thus admitted.

For facilitating walking with a ski boot according to the invention, the anchoring bolt for anchoring the cylinder-piston-aggregate on the boot leg is preferably releasably mounted on the boot leg and secured against loss, the cylinder-piston-aggregate being linked, particulary by means of a catch strap, for limited pivoting movement on the anchoring bolt arranged on the boot shell. When loosening the anchoring bolt on the boot leg, the boot leg is allowed to freely move relative to the boot shell and the boot leg will thus not represent a hindrance on walking. For preventing the resilient and damping element from falling down after having loosened the upper anchoring bolt, the pivotability of the cylinder-piston-arrangement on the anchoring bolt arranged on the boot shell is limited, for which purpose one can do with a simple catch strap.

The anchoring bolt for the cylinder-piston-aggregate and arranged on the boot shell is preferably arranged on an eccentric which can be locked in the various pivotal positions. By changing the position of the eccentric, the neutral position can, in dependence on the capabilities of the skier, be shifted for ±2 degrees from the forward lean position of approximately 12 degrees.

In the following the invention is further illustrated with reference to an embodiment shown in the drawing.

Figure 6:
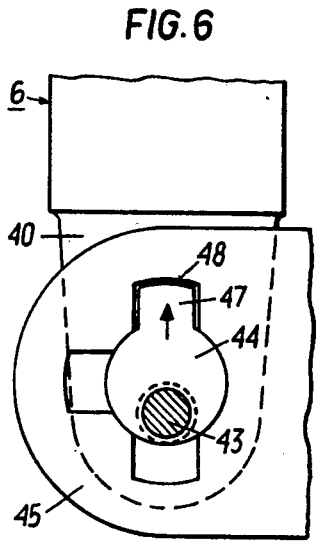
Figure 7:
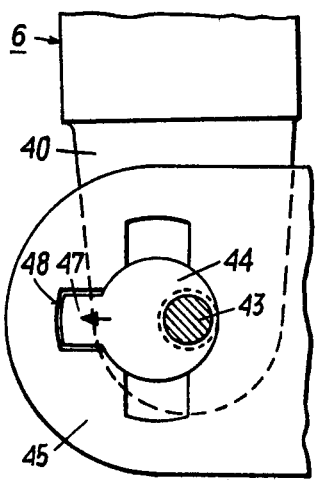
Figure 8:
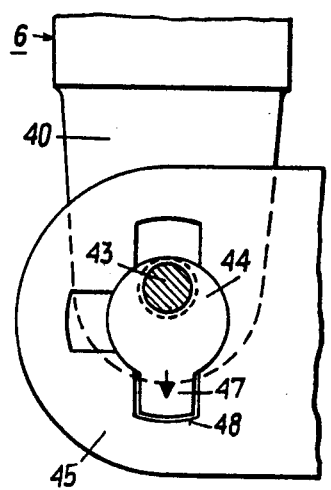
Figure 2:
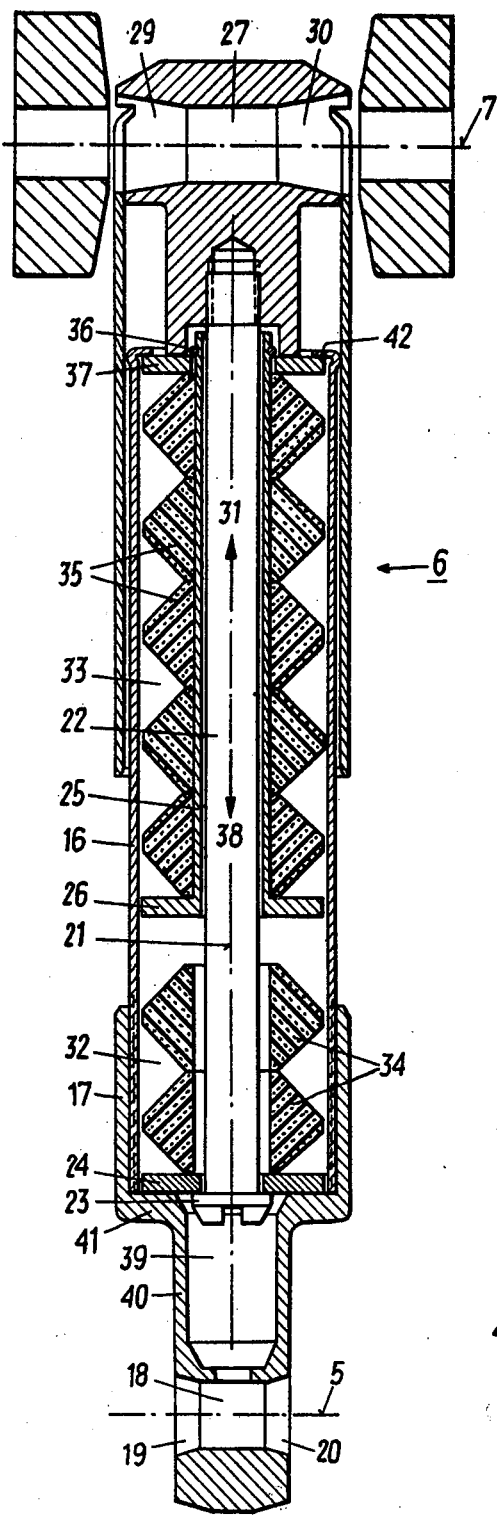
Figure 5:
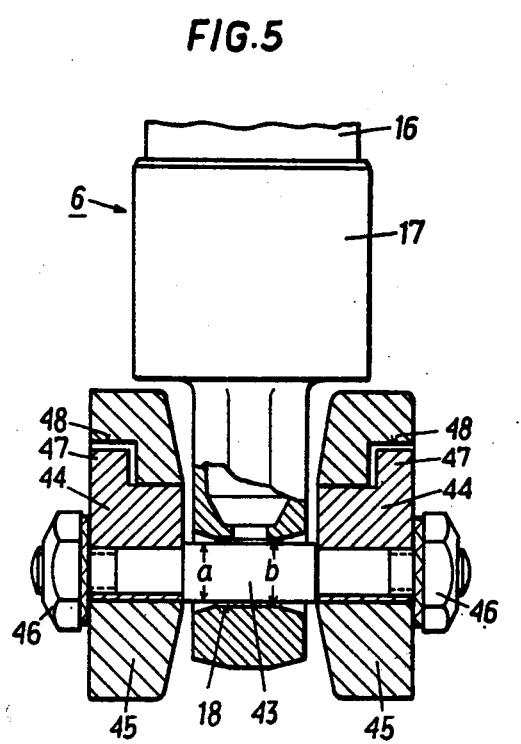

In the drawing:

FIG. 1 schematically represents a lateral view of a ski boot according to the invention, FIG. 2 is a section through the resilient and damping element in its neutral position, FIG. 3 is a section corresponding to the section of FIG. 2 and showing the boot leg in its maximum back lean position, FIG. 4 is a section corresponding to the section of FIG. 2 and showing the maximum forward lean position of the boot leg, FIG. 5 shows a detail of the pivotal connection of the resilient and damping element on the boot shell and FIGS. 6 to 8 show various pivotal positions of the eccentric of the pivotal axis establishing a connection with the boot shell.

In FIG. 1 the boot leg is designated 1 and the boot shell is designated 2. The axis 3 of the boot leg 1 includes with the sole plane 4 in the neutral position an angle $\alpha$ of approximately 9° to 12°. A resilient and damping element 6 is linked to the boot shell 2 for pivotal movement around a pivotal axis 5 and linked with its other end to the boot leg 1 for pivotal movement around a pivotal axis 7. The resilient and damping element 6 is secured against swivelling movement against arrow 9 by means of a catch strap 8 which swivelling movement would otherwise be possible after having loosened the pivotal bolt associated with the pivotal link 7. The axis 3 of the boot leg 1 can be swivelled around the pivotal joint 10 in direction of arrow 11 into the forward lean position thereby subjecting the resilient and damping element 6 to tension stress. Any friction between the boot leg 1 and the boot shell 2 is, however, avoided over the whole admitted pivotal path. The same applies for the pivotal movement in direction of arrow 12, in which case the resilient and damping element is subjected to compression stress. The boot leg 1 is connected with the wrist area of the boot shell 2 by means of bellows 13 and with the heel area of the boot shell 2 by means of bellows 14, so that the boot leg 1 is tightly connected to the boot shell 2 in a reliable manner. 15 indicates a closure member arranged on the boot leg 1.

The resilient and damping element 6 is shown in FIG. 2 in an enlarged scale and in a cross-section. The resilient and damping element 6 is designed as cylinder-piston-aggregate having its cylinder 16 closed at its lower end by means of a screw cap 17. A bearing eye 18 is rigidly connected with the screw cap 17 and conically in shape at 19 as well as at 20 for allowing swivelling movements out of the axis 21 of the cylinder-piston-aggregate. The cylinder-piston-aggregate is provided with a piston rod 22 having at its bottom end 23 stops for an annular disc 24. There is further provided a pressure bushing 25 concentrically relative to the piston rod 22, said pressure bushing 25 having a radial flange 26 designed as an annular disc. The piston rod 22 is rigidly connected with a head 28 being provided with a further bearing eye 27. The bearing eye 27 is equally provided with conical openings 29 and 23 for permitting oblique positions out of the axis 21. When subjecting the piston rod 22 to tension stress in direction of arrow 31, the surface of the stop 23 hits the annular disc 24 so that the annular disc 24 forming the thrust piston becomes lifted. The working space 32, 33 of this thrust piston formed by the annular disc 24 accommodates rubber rings 34, 35 having a trapezoidal cross-section. On movement of the piston rod 22 in direction 31, the rubber rings 34 and 35 become deformed such that the rubber rings contact the piston rod 22 as well as the cylinder wall of the cylinder 16. With increasing pressure contact of the rings with the piston rod and with the wall of the cylinder 16 the damping action is gradually increased. Within the upper working space 33 the rubber rings 35 are, with increasing deformation of their cross-section, pressed against the external wall of the pressure bushing 25. This pressure bushing 25 is freely taken along in direction of arrow 31 on tension stress of the piston rod 22 and is freely shiftable relative to the piston rod 22. For preventing the pressure bushing 25 from entering in direction to the interior of the cylinder-piston-aggregate and thus for preventing any damage of the inner edge of the rubber ring 35, a snap ring 36 is provided which prevents the pressure bushing 25 from passing through the upper limiting disc 37 in downward direction. The end-position of the cylinder-piston-aggregate resulting from such tension stress of the piston rod 22 is shown in FIG. 4, from which can be derived that in the mentioned end-position all rubber rings 34 and 35 are nearly completely deformed. In view of rubber being, as well as elastomeric materials, not compressible, a stop is generated in this end-position, which stop prevents the piston rod 22 from being further extracted in direction of arrow 31. During the final stage of this movement, a strong damping action is obtained in view of the friction between the increasing contacting areas of the rubber rings 34 and 35 on the wall of the cylinder 16 as well as on the piston rod 22 and, respectively, on the pressure bushing 25. The stroke in direction of arrow 31 is thus only limited by a substantially complete deformation of all rubber rings. Such a stress in direction of arrow 31 corresponds to a pivotal movement of the axis of the boot leg in direction to the forward lean position and the dimensions are selected such that pivotal movement is only possible to an angle located before the locking angle of the ankle joint.

FIG. 2 shows the cylinder-piston-aggregate 6 in its neutral position which shall correspond to a usual mean forward lean or vorlage of approximately 9 to 12 degrees.

When backwardly swivelling the boot leg, as is for instance desired on standing or walking, the piston rod is subjected to pressure stress in direction of arrow 38. In this case, the piston rod 22 enters a recess 39 of the constructional part 40 comprising the bearing eye 18. In such case, also the pressure bushing 25 is taken along, together with the piston rod 22, in direction of arrow 38. The annular disc 24 forming the thrust piston is seated on an inwardly extending flange 41 of the screw cap 17 and the outwardly extending flange 26 of the pressure bushing 25 is now acting as a plunger compressing the rubber rings 34. The end of this compression stroke in direction of arrow 38 is shown in FIG. 3 from which can be derived that also in this case a damping action is obtained by compressing the rubber rings 34 between the piston rod 22 and the cylinder 16. The upper limiting disc 37 is equally taken along through the head 28, and the cylinder 16 has at its upper end an inwardly extending rim 42 limiting the upward stroke of the limiting disc 37 in case of a tensioning stroke in direction of arrow 31. In this manner it is made sure that the pressure bushing 25 cannot pass through the upper limiting disc 37 so that the rubber elements can be spared.

FIG. 5 shows the type of anchoring of the cylinder-piston-aggregate on the boot shell. An anchoring bolt 43 extends through the bearing eye 18 at the lower end of the cylinder-piston-aggregate 6 and has an outer diameter a which is smaller than the smallest internal diameter b of the bearing eye 18. The anchoring bolt 43 is fixed to an eccentric 44 which is rotatably arranged within claws 45 of the boot shell. The anchoring bolt 43 is at both of its ends tightly pressed against the eccentric by means of nuts 46.

The various pivotal position of the eccentric 44 results in different height positions of the pivotal axes 5 defined by the anchoring bolt 43 and associated with the boot shell. This is schematically shown in FIGS. 6 to 8. In the bottom-most position as shown in FIG. 6, the neutral position shown in FIG. 2 of the cylinder-piston-aggregate can be adjusted to an angle corresponding to a forward lean or vorlage of approximately 10 degrees. In the mean position shown in FIG. 7, the dimensioning is preferably such that there results a usual forward lean of the boot leg axes and thus of the wearer's leg of approximately 12 degrees, noting that the neutral position of the cylinder-piston-aggregate 6 will then occur at a forward lean angle of 12 degrees. In a third position of the eccentric 44, which position is shown in FIG. 8, the neutral position of the resilient and damping element 6 can be adjusted to a greater angle of forward lean of, for example, 14 degrees. The positions of the eccentric 44 shown in FIGS. 6 to 8 can be locked by engaging a nose 47 of the eccentric 44 in corresponding recesses 48 of the claws 45.

What is claimed is:

1. A ski boot comprising a leg pivotally linked to a shell and a means for limiting the pivotal movement of the leg relative to the shell, particularly in combination with an inner boot characterized in that the boot leg is linked to the boot shell for free pivotal movement and in that the means for delimiting the pivotal movement of the boot leg includes a resilient and damping element in the form of a double acting piston and cylinder aggregate which is pivotally fixed beween the boot leg and the boot shell on the boot leg and on the boot shell, the piston and cylinder aggregate have working spaces containing elastomeric synthetic plastics materials whose cross-sectional shape is, in a neutral position of the boot leg relative to the boot shell only incompletely fills the volume of the working spaces.

2. A ski boot as claimed in claim 1 characterized in that the internal wall of the boot leg is kept at a distance from the external wall of the boot shell over the whole pivotal path.

3. A ski boot as claimed in claim 1 or 2 characterized in that the boot leg is connected at the wrist portion and at the heel portion with the boot shell by means of bellows.

4. A ski boot as claimed in claim 1 or 2 characterized in that the resilient and damping element is arranged at the heel portion of the shoe.

5. A ski boot as claimed in claim 1 characterized in that the elements of elastomeric synthetic plastics material are designed as O-rings having a substantially triangular cros-section, the rings being stacked one above the other in axial direction of the cylinder-piston-aggregate.

6. A ski boot as claimed in claim 1 characterized in that a plunger and a thrust piston are designed as separate discs, said discs cooperating with stops of a piston rod.

7. A ski boot as claimed in claim 6 characterized in that the stop of the disc forming the plunger is designed as a pressure bushing arranged for being shifted relative to the piston rod and extending through the elements arranged for damping the movement in direction to forward lean position and extending through an upper limiting disc.

8. A ski boot as claimed in claim 7 characterized in that the pressure bushing has an axial lenght corresponding to 60 to 80% of the total axial lenght of the relaxed elements of elastic synthetic plastics material, particulary rubber.

9. A ski boot as claimed in claim 1 or 2 characterized in that the cylinder-piston-aggregate is provided at both of its ends with bearing eyes, the inner diameter of which at least partially exceeds the diameter of the associated anchoring bolt.

10. A ski boot as claimed in claim 1 characterized in that the anchoring bolt for anchoring the cylinder-piston-aggregate on the boot leg is releasably mounted on the boot leg and secured against loss, the cylinder-piston-aggregate being linked, particulary by means of a catch strap, for limited pivotal movement on the anchoring bolt arranged on the boot shell.

11. A ski boot as in claim 1 wherein said plastics materials are rubber elements.

12. A ski boot as in claim 1 wherein said neutral position is a relaxed position corresponding to a usual forward lean or vorlage of 9 to 12 degrees relative to the sole plane.

13. A ski boot as in claim 1 wherein the internal wall of the boot leg is kept at a distance from the external wall of the boot shell by means of friction-reducing washers at the joints.

14. A ski boot comprising a leg pivotally linked to a shell and a means for limiting the pivotal movement of the leg relative to the shell, particularly in combination with an inner boot characterized in that the boot leg is linked to the boot shell for free pivotal movement and in that the means for delimiting the pivotal movement of the boot leg includes a resilient and damping element in the form of a double acting piston and cylinder aggregate which is pivotally fixed between the boot leg and the boot shell on the boot leg and on the boot shell, there being an anchoring bolt for the cylinder-piston-aggregate arranged on an eccentric which can be locked in the various pivotal positions.

* * * * *